Figure 1:
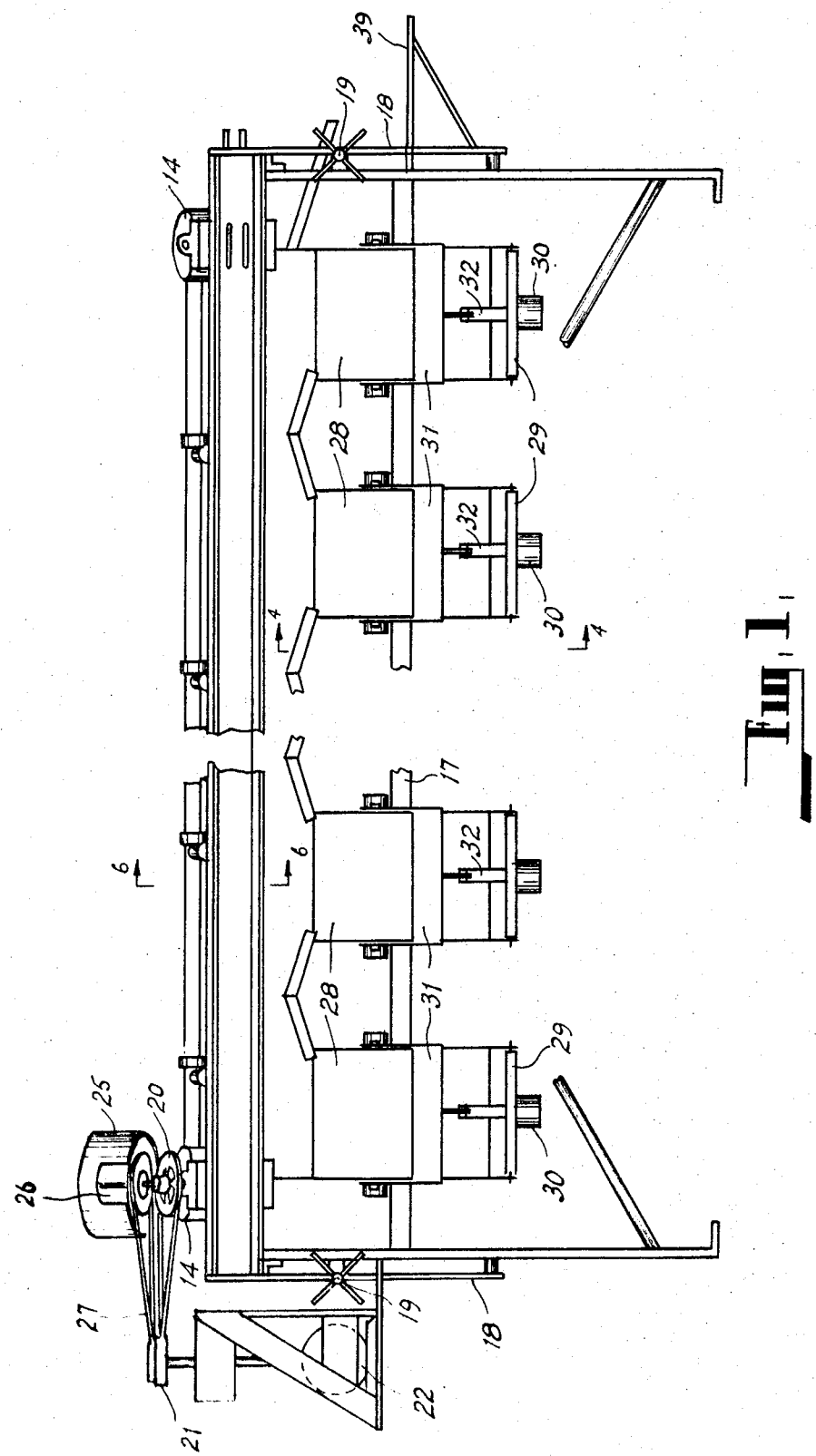

United States Patent
Powell

[15] 3,693,789
[45] Sept. 26, 1972

[54] PRAWN SORTING MACHINE
[72] Inventor: George Powell, Fremantle, Australia
[73] Assignee: E. M. S. Holdings Pty. Ltd., Western Australia, Australia
[22] Filed: Oct. 20, 1970
[21] Appl. No.: 82,263

Related U.S. Application Data

[63] Continuation-in-part of Ser. No. 815,427, April 11, 1969, abandoned.

[52] U.S. Cl. ..................................209/73, 209/102
[51] Int. Cl. ............................................B07b 13/04
[58] Field of Search..................209/73, 102, 74, 121

[56] References Cited

UNITED STATES PATENTS

| | | | |
|---|---|---|---|
| 2,292,068 | 8/1942 | Grayson | 209/102 X |
| 3,517,808 | 6/1970 | Lauer | 209/121 X |
| 3,547,263 | 12/1970 | Green | 209/102 |
| 3,422,954 | 1/1969 | Crawford | 209/102 |
| 2,776,746 | 1/1957 | Envoldsen | 209/102 |

Primary Examiner—Allen N. Knowles
Attorney—Watson, Leavenworth, Kelton & Taggart

[57] ABSTRACT

A prawn sorting machine having a pair of conveyor members mounted adjacent each other so as to carry prawns therebetween, the conveyor members having a diverging opening therebetween in the direction of travel thereof, to allow prawns carried between the conveyor members to fall therefrom onto adjoining chutes located below the opening, the angle of divergence of the opening being greater above any one chute than that above an adjacent chute preceding it in the direction of travel.

6 Claims, 6 Drawing Figures

PRAWN SORTING MACHINE

This application is a continuation-in-part of my U.S. Pat. application entitled "Prawn Sorting Machine," Ser. No. 815,427 filed Apr. 11, 1969 now abandoned.

It is known to sort or grade prawns by the use of machines having divergent belts and the like, in which the angle of divergence of the belts is constant throughout the machine. Prawns are generally graded in increments of 5 prawns to the pound, the generally accepted grades being 10–14; 15–19; 20–24; 25–29; 30–34; 35–39; and 40–44 prawns to the pound. To achieve these gradings using a machine in which the diverging opening has a constant angle of divergence throughout its length, it is necessary that the grading length for the 10–14 prawns/pound size is approximately four times that for the length of prawns/pound. 40–44 prawns/pound. Thus besides having a machine which takes up an unnecessary length as far as space is concerned, it also results in a machine having unequal size grading stations.

It is therefore an object of the present invention to provide a machine for grading or sorting large quantities of prawns or shrimps quickly and without damage to at least the edible portion of the prawn, the machine being compact in length and having equal size grading stations.

Accordingly the present invention resides in a prawn sorting machine comprising a pair of conveyor members mounted adjacent each other so as to carry prawns therebetween, the conveyor members being adapted to be driven in the same direction and having a diverging opening therebetween in the direction of travel thereof so as to allow prawns carried therebetween to fall onto a plurality of adjoining chutes located below said divergent opening when the width of the divergent opening corresponds to the size of the prawns, the angle of diverence of the portion of the divergent opening above anyone chute being slightly greater than that of the portion of the divergent opening above an adjacent chute immediately preceding it in the direction of travel of the conveyor members.

Preferably each of said conveyor members comprises a substantially flat endless belt mounted immediately above an endless belt having a substantially circular cross-section, the surfaces of the flat belts being inclined inwardly and downwardly of each other so as to direct prawns towards the lower belts of circular cross-section, said divergent opening being formed between said lower belts.

In order, however, that the invention may be better understood it will now be described with reference to the accompanying drawings, but it will be appreciated that the invention is not limited to this particular embodiment.

Figure 2:
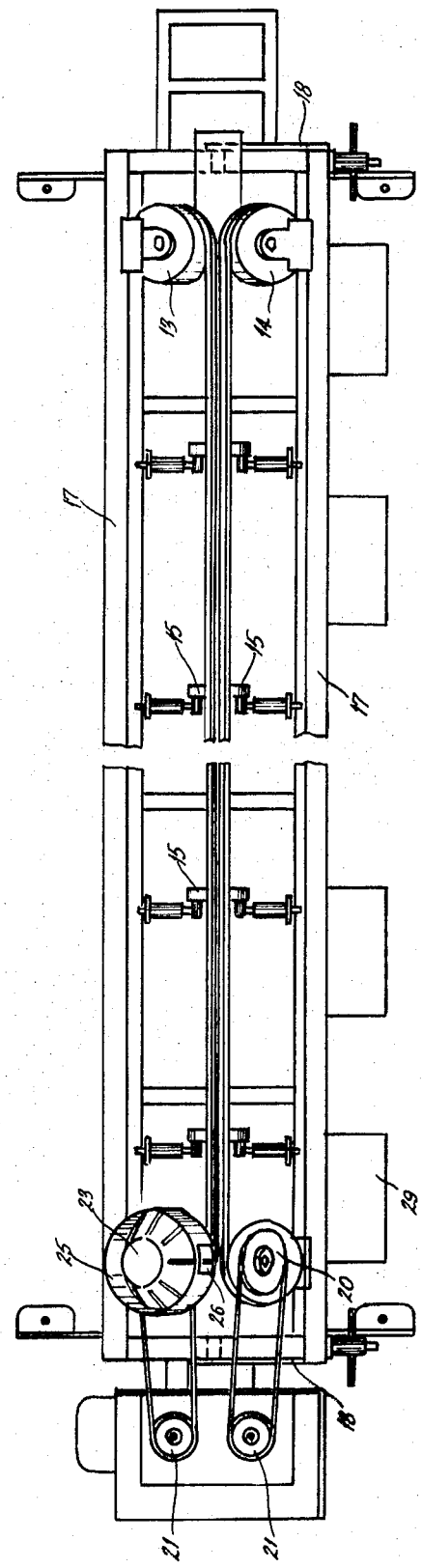
Figure 3:
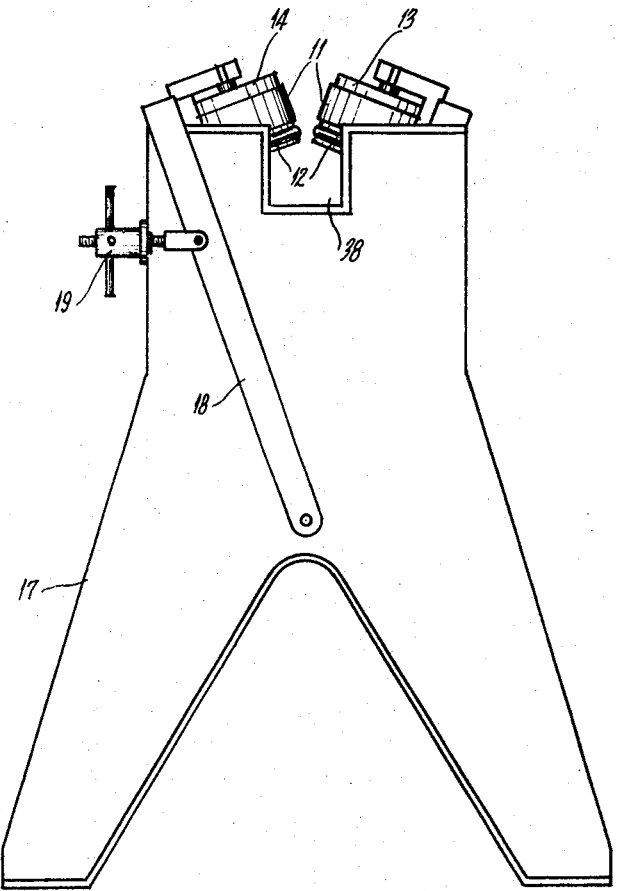
Figure 5:
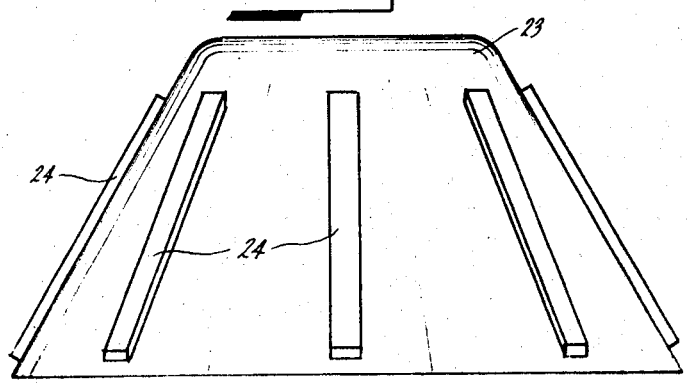
Figure 4:
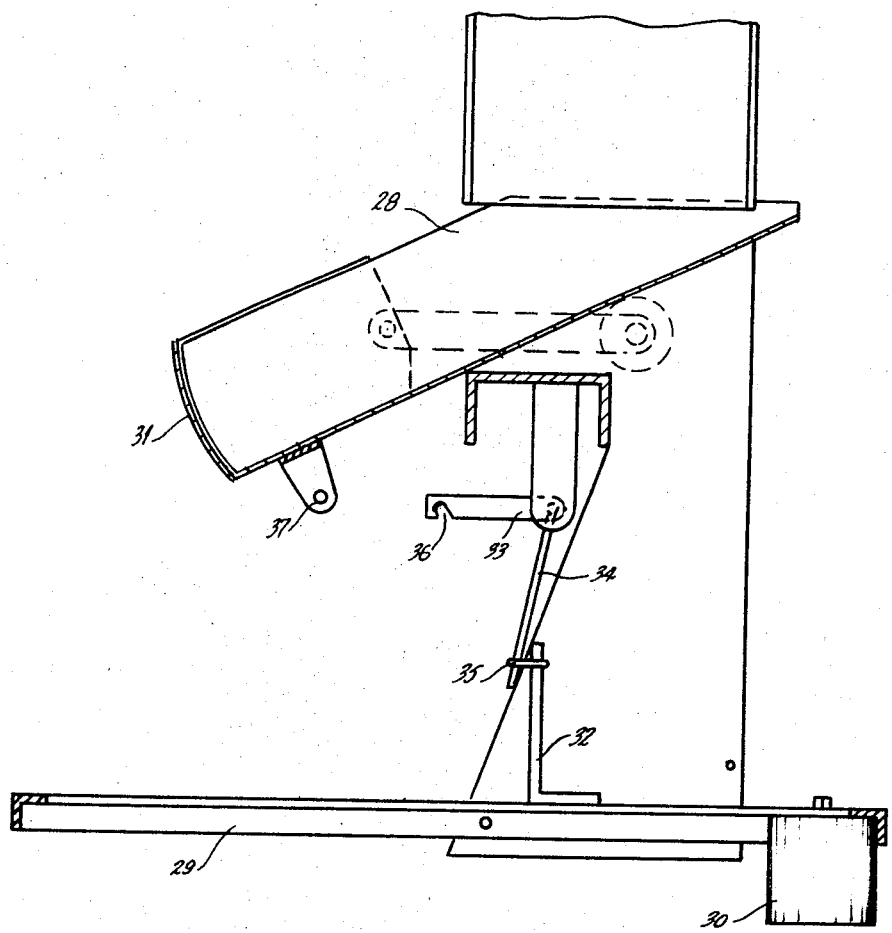
Figure 6:
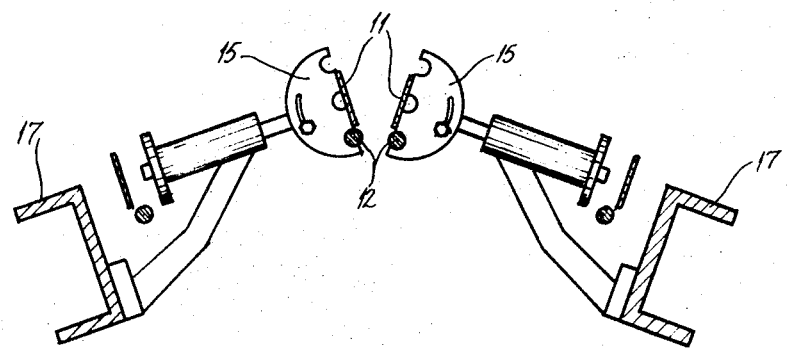

In the drawings:

FIG. 1 is a front elevation;
FIG. 2 is a plan view;
FIG. 3 is an end elevation;
FIG. 4 is a section on the line 4—4 of FIG. 1;
FIG. 5 is a side elevation of a feeding head for feeding the prawns to the belts; and
FIG. 6 is a section on the line 6-6 of FIG. 1.

In the embodiment shown in the drawings the conveyor members each comprise an upper substantially flat endless conveyor belt 11 mounted immediately above a lower endless conveyor belt 12 of substantially circular cross-section, the belts 11 and 12 forming the conveyor members being mounted so as to run over rollers 13 and 14 at the ends of the run of the belts the rollers being mounted on spindles inclined upwardly and away from each other, so that adjacent surfaces of the flat belts 11 are inclined inwardly and downwardly to each other, the lower edges being adjacent to the belts 12 which belts diverge in the direction of travel thereof so as to provide a diverging opening through which the prawns fall during the grading or sorting operation. The belts 11 and 12 are preferably formed of nylon having a coating of polyurethane thereof. The portion of the belts 11 and 12 on which the prawns are carried are supported at spaced positions in their run by supporting members 15 so as to prevent any undue sagging or spreading of the belts due to the weight of prawns being carried thereby and thus serve to accurately maintain the spacing of the belts 12 which form the divergent opening. The supporting members 15 are spaced so that they are located preferably one at either side of each of a plurality of adjoining chutes 28 which each feed to a separate collecting bowl or container (not shown). In this embodiment the supporting members 15 which are attached to a supporting framework 17 of the machine, are equally spaced apart and are so located that the angle of divergence of the opening above anyone chute 28 is slightly greater than that part of the opening above the chute immediately preceding it in the direction of travel of the belts.

The rollers 13 around which one set of belts 11 and 12 passes are mounted on the fixed framework 17 which supports the sorting machine, whilst the rollers 14 around which the other set of belts 11 and 12 passes are mounted one to each of a pair of arms 18 pivotally mounted on the supporting framework 17 for limited rotation, in a substantially vertical plane at right angles to the direction of travel of the belts 11 and 12. The positions of the arms 18 are adjusted by screw means 19 connected between the arms 18 and the framework 17 and the movement of the arms 18 are independant of each other. This allows the divergent opening that is the angle of divergence, to be varied as desired. The position of the rollers 13 and 14 at one end of each of the sets of belts 11 and 12 is preferably adjustable in the direction of travel of the belts so as to regulate the tension in the belts.

The spindles on which the rollers 13 and 14 are mounted at the other end of each of the sets of belts 11 and 12, are preferably provided with a pulley 20 which are each connected via a belt drive to a further pulley 21, the pulleys 21 being preferably connected through identical gearing to a common motor 22 to ensure that they travel at the same speed. A gear box may be incorporated into the drive system if desired, to vary the speed of travel of the sets of belts 11 and 12.

At the feed end of the machine, that is at the end where the belts 12 are closest together, the upper end of the spindle on which the roller 13 is mounted is provided with a rotatable feeding head 23 which feeds prawns onto the conveying belts. The feeding head 23 as best seen in FIG. 5 of the drawings is preferably in the shape of a frustum of a cone, the curved surface of the head 23 having a plurality of equally spaced converging ribs 24. The head 23 is surrounded by an annular shield 25 having an opening 26 located therein so as to be substantially above the divergent opening between the belts 12. The head 23 is rotated by a belt pulley arrangement 27 from the shaft on which one of the pulleys 21 are mounted. The peripheral speed of the feeding head 23 is chosen so as to be slightly less than the speed of travel of the belts 11 and 12 to ensure that the prawns are not deposited upon each other on the belts.

In this embodiment the collecting containers (not shown) into which the chutes 28 feed, are each located at one end of the balance table 29 the other end of the balance table being provided with a counterweight 30. A gate 31 which is adapted to close off the discharge end of the chute 28 is operatively connected to the balance table 29 so that when a predetermined weight of prawns has been discharged into the collecting container, the weight of prawns causes the container and the balance table 29 on which it is located, to move downwardly resulting in the gate 31 closing the discharge end of the chute 28 feeding the collecting container. The connection between the chute and the balance table is provided by means of a post 32 projecting upwardly from the balance table 29, and an L-shaped connecting member pivotally mounted on the supporting framework 17 at a position beneath the chute 28, the pivotal connection being at the junction of the legs 33 and 34 of the L-shaped connecting member. The L-shaped connecting member is positioned so that one of the legs 33 is substantially horizontal and directed towards the underside of the discharge chute 29, whilst the other leg 34 of the connecting member is located so as to be directed downwardly towards the post 32. The lower end of the leg 34 is located adjacent to and overlying the upper end of the post 32 and is connected thereto by means of an elastic member which in this embodiment is an elastic ring 35 which encircles both the post 32 and the lower end of the leg 34. The free end of the leg 33 is provided with a hook shaped catch 36 which is adapted to engage a bar 37 on the undersurface of the gate 31 so as to hold the gate in an open position. When the predetermined weight of prawns is collected in the container, the balance table 29 rotates about its balance point and the post 32 bears against the leg 34 of the connecting member to cause it to move against the action of the elastic ring 35. The hook shaped catch 36 thus releases the bar 37 and the gate 31 is biased by spring means (not shown) to close off the discharge end of the chute 28. The gate 31 is re-opened manually after the collecting container has been emptied and replaced. With the above construction, a reasonably accurate automatic weighing check may be provided.

Operation of the machine is as follows:

Prawns are fed preferably by means of an elevator conveyor onto the rotating feed head 23 above the feed end of the sets of conveyor belts 11 and 12. The spacing between the belts 12 is adjusted by means of the screws 19 so as to achieve the desired opening and if desired the spacing between the supporting members 15 of the pairs of supporting members may also be adjusted. When the belts are set in motion, prawns discharging from the opening 26 in the shield 25, onto the belts, are carried by the belts until the divergent opening between the belts 12 is sufficiently wide to let the prawns pass therebetween. The prawns thus fall into one of the chutes 28 leading to the collecting containers where they are collected for further processing. Any oversize prawns pass along the full length of the belts and out through an opening 38 at the end of the machine to drop into a further collecting container (not shown) supported on a platform 39 mounted on the supporting framework 17.

I claim:

1. A prawn sorting machine comprising a pair of conveyor members mounted adjacent each other so as to carry prawns therebetween, the conveyor members being adapted to be driven in the same direction and having a diverging opening therebetween in the direction of travel thereof so as to allow prawns carried therebetween to fall onto a plurality of adjoining chutes located below said divergent opening when the width of the divergent opening corresponds to the size of the prawns, the angle of divergence of the portion of the divergent opening above any one chute being slightly greater than that of the portion of the divergent opening above an adjacent chute immediately preceding it in the direction of travel of the conveyor members, each conveyor member comprising a substantially flat endless belt and an endless belt having a substantially circular cross-section, the flat endless belt being mounted immediately above said belt of circular cross-section the surfaces of the flat belts of the pair of conveyor members being inclined inwardly and downwardly of each other so as to direct towards the belts of circular cross-section below, said divergent opening being formed between said belts of circular cross-section.

2. A prawn sorting machine as claimed in claim 1, wherein said belts are formed of nylon having a coating of polyurethane thereon.

3. A prawn sorting machine as claimed in claim 1, wherein a plurality of adjoining chutes are located below said divergent opening, each of said chutes feeding to a collecting container.

4. A prawn sorting machine as claimed in claim 3, wherein the portions of the belts on which the prawns are carried are supported at spaced positions by supporting members, said supporting members being so located as to assist in the formation of the portions of the divergent opening having different angles of divergence.

5. A prawn sorting machine as claimed in claim 3 wherein each of said collecting containers is located at one end of a balance table, said balance table being pivotally mounted for rotation about a substantially horizontal axis intermediate its ends, the other end of said balance table being provided with a counterweight, said balance table being operatively associated with a gate adapted to close off the discharge end of said chute such that when a predetermined weight of prawns has been discharged in the collecting container, said balance table rotates to cause the gate to close the discharge end of said chute.

6. A prawn sorting machine as claimed in claim 3, wherein the feed end of the belts is provided with a rotatable feeding head, said feeding head comprising a frustum of a cone having a plurality of equally spaced converging ribs on its curved surface, said feeding head being surrounded by an annular shield having an opening located therein so as to allow prawns to discharge onto the belts, the peripheral speed of the feeding head being less than the speed of travel of the belts.

* * * * *